United States Patent
Grigorovitch et al.

(10) Patent No.: US 7,564,974 B2
(45) Date of Patent: Jul. 21, 2009

(54) FRAME-ACCURATE EDITING METHODS AND SYSTEMS

(75) Inventors: Alexandre V. Grigorovitch, Redmond, WA (US); Chih-lung Bruce Lin, Redmond, WA (US); Gareth Alan Howell, Kirkland, WA (US); Mei L. Wilson, Redmond, WA (US); Niranjan S. Nayak, Bellevue, WA (US); Olivier Colle, Redmond, WA (US); Randolph B Oakley, Bellevue, WA (US); Blake Bender, Woodinville, WA (US); Tony M. Antoun, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 900 days.

(21) Appl. No.: 10/836,824

(22) Filed: Apr. 30, 2004

(65) Prior Publication Data

US 2005/0244005 A1 Nov. 3, 2005

(51) Int. Cl.
H04N 7/167 (2006.01)
G06K 9/36 (2006.01)

(52) U.S. Cl. ....................... 380/217; 382/236
(58) Field of Classification Search ................. 380/205
See application file for complete search history.

(56) References Cited

U.S. PATENT DOCUMENTS 6,256,451 B1 7/2001 Mitsui
6,553,150 B1 * 4/2003 Wee et al. .................... 382/243

FOREIGN PATENT DOCUMENTS

| EP | 0855714 A2 | 7/1998 |
| EP | 0926678 | 6/1999 |
| JP | 9298711 | 11/1997 |

OTHER PUBLICATIONS

Hedtke, et al., "Schnittbearbeitung Von MPEG-2-Codierten Videoquenzen", FKT Fernseh UND Kinotechnik, Fachevriag Schiele & Schon GMBH, Berlin, De, vol. 50, No. 7, Jul. 1, 1996, pp. 367-373.
Foreign Search Report dated Mar. 13, 2007 relating to Application No. PCT/US2004023627.

* cited by examiner

*Primary Examiner*—Brandon S Hoffman
(74) *Attorney, Agent, or Firm*—Lee & Hayes, PLLC

(57) ABSTRACT

Methods and systems enable content authors to achieve frame-accurate editing and, in at least some embodiments, reduce the amount of content that needs to be decompressed in order to operate on the frames. Some embodiments ensure that bit rate integrity is preserved so that bit rate conditions associated with streaming environments are preserved. Various embodiments intelligently determine which content portions should be decompressed, processed, and recompressed and which content portions should not be decompressed.

24 Claims, 13 Drawing Sheets

FRAME-ACCURATE EDITING METHODS AND SYSTEMS

TECHNICAL FIELD

This invention relates to methods and systems for creating and editing multimedia content.

BACKGROUND

Some multimedia applications provide a user with the ability to create and edit media content. For example, the user might have multiple different files that contain multimedia content and the user may wish to produce, from the multiple files, one file that contains edited content. These multimedia applications typically enable the user to trim certain portions of the files and/or stitch the files together in some fashion. These types of applications may also allow the user to add effects and transitions to the edited content. An effect is something that can cause the content to be modified so that it is presented in a manner that is different from the originally recorded content. For example, causing color video to be presented as black and white video is an example of an effect. A transition constitutes some means for changing between different content, e.g. a wipe transition.

There are, however, shortcomings with many multimedia applications and systems that are available today. Specifically, many applications and systems force trimming to be done only at key frames or frames that are independently decodable.

As an example, consider FIG. 1 which shows two key frames (K) and a number of intermediate frames (I). Key frames are frames that can be decoded or decompressed without any dependence on other frames. Intermediate frames, on the other hand, depend on other frames for decoding because they contain only data that describes differences relative to the other frames. Assume now that during the course of editing multimedia content, the user desires to trim the content at an intermediate frame—designated as the "desired trim point" in FIG. 1. Many applications treat this problem in one of two ways. First, an application may allow trimming at this point, but will force decompression of the entire file. Second, the application may not allow trimming at the intermediate frame, but rather will force trimming to take place at the previous key frame—designated as the "forced trim point" in FIG. 1. Needless to say, neither of these solutions is desirable as, in the first case, content that is not necessarily needed for the user-desired processing is decompressed and recompressed thus adding to the processing complexity and overhead. In the second case, the user's editing wishes are not complied with and, in this particular example, will result in including content that the user does not wish to include.

Consider now that the user wishes to piece together portions of two different files. Many applications will allow files to be stitched together—but do so blindly and without any regard to or appreciation for the effects of stitching the files together. That is, typically in this scenario, the entire file of each portion to be stitched together is decompressed, blindly stitched together, and recompressed. One problem that can arise from this scenario, in addition to decompressing unneeded content, is that at the junction of the two file portions, bit rate conditions (such as maintaining a constant bit rate) for file streaming may be violated such that when the file is streamed, the viewer may see a glitch or some other manifestation of degraded quality. For users who wish to share their projects over a network by streaming the resultant output file to another user, this solution is undesirable.

With respect to the quality issue, decompressing the entirety of each file, operating upon portions of the decoded files, and then re-encoding the output file can be problematic for a couple of different reasons. First, by decoding the entirety of the files, portions that are not operated upon by the user are unnecessarily decoded. Second, re-encoding the entire output file, as noted above, is very expensive in terms of the resources and the time required for re-encoding. Additionally, and perhaps more importantly, each time that content is decoded and re-encoded, it resembles the original content less and less. This can and does lead to degraded quality.

SUMMARY

Methods and systems enable content authors to achieve frame-accurate editing and, in at least some embodiments, reduce the amount of content that needs to be decompressed in order to operate on the frames. Some embodiments ensure that bit rate integrity is preserved so that bit rate conditions associated with streaming environments are preserved. Various embodiments intelligently determine which content portions should be decompressed, processed, and recompressed and which content portions should not be decompressed.

DETAILED DESCRIPTION

Overview

Figure 1:
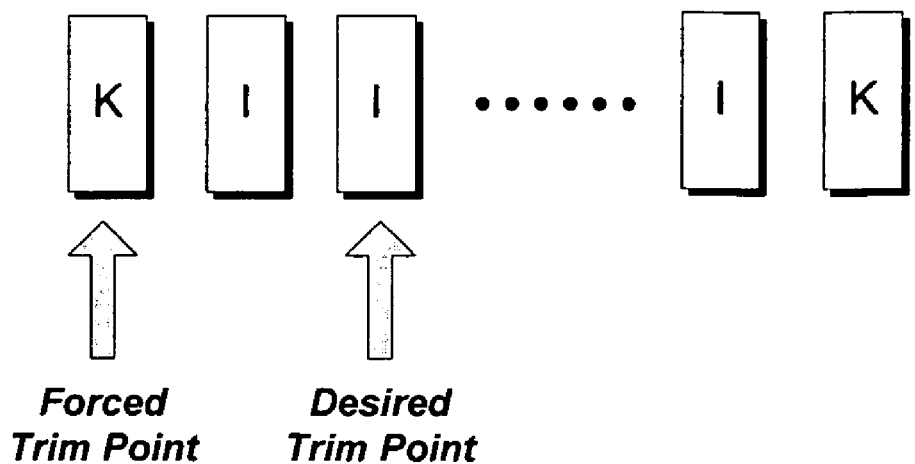
FIG. 1 is a block diagram that illustrates exemplary key and intermediate frames.

The methods and systems described below can enable content authors to achieve frame-accurate editing, while reducing the processing complexities associated with doing so. In addition, in at least some of the embodiments, the systems and methods can ensure that bit rate integrity is preserved so that bit rate conditions associated with streaming environments are preserved. In the approach that is described, the various methods and systems are directed to intelligently determining which content portions should be decompressed, processed, and recompressed and which content portions should not be decompressed. The described approaches can enable content authors to produce even higher quality content in much less time than previously possible.

In at least some embodiments, the systems and methods described herein can permit applications to be created that can abstract away the notion of a source file and instead, can present to the user a series of clips or segments that represent the source file. These clips or segments, in turn, can be individually manipulated by the user via an application as by copying, moving, and the like. The inventive embodiments described herein can permit that type of source file representation.

Before undertaking a discussion of the various embodiments described below, the following terminology and related concepts will be used. The term bit rate is a throughput parameter and refers to the number of bits per second that can, for example, be streamed over a network. The term constant bit rate refers to a bit rate that is generally or on average constant. For example, in streaming applications, the network bandwidth or bit rate for streaming is assumed to be constant. A buffer window refers to the minimal pre-roll time required to ensure smooth playback without delay in a streaming session, assuming a constant network bandwidth. The term buffer fullness refers to information that is used to ensure that compression that is applied to data meets a constant bit rate for given a buffer window. This will become more apparent below.

In addition, in the description that follows, the terms "encoding" and "compression" or "compressing" are used interchangeably. Likewise, the terms "decoding" and "decompressing" or "decompression" are used interchangeably. In addition, the term "samples" is used to refer to individual segmentable portions of a file, such as individual frames.

In the discussion that follows, various methodologies that are utilized to provide the advantages listed above are first discussed. Then, an exemplary component and system in which the methodologies can be employed is discussed. It is to be appreciated and understood that the methodologies about to be described can be implemented in connection with components and systems that are different from the specific system that is described below, without departing from the spirit and scope of the claimed subject matter.

Exemplary Methodologies

In the discussion that follows, examples of the inventive methodologies are provided in the context of trimming a file, stitching files together, stitching files together with transitions and applying effects to a file, each under its own separate heading. These methodologies, as indicated above, are directed to intelligently determining which portions of one or more files should be decompressed and processed and which portions should not be decompressed. To that end, the various embodiments can receive compressed multi-media files that are subject to one or more operations that require at least a portion of one or more file segments to be decoded. In accordance with at least some of the embodiments, only those portions of the file segments that are necessary to be decoded are decoded in order to perform the operations. One result of this process is that less than an entirety of the multi-media file(s) are decoded for the purpose of performing the operation(s).

Trimming a File

When a file is trimmed, portions of the file are removed. For example, a user may wish to trim a beginning portion, a middle portion and/or an end portion of the file to edit out content that they do not wish to appear in their particular project. As an example, consider FIG. 2 which diagrammatically represents an encoded or compressed source file. To trim a particular file, the user typically interacts with a software application that permits creation and editing of the multimedia files. One such application is Windows® Movie Maker application, although it should be apparent that other applications can be utilized.

Figure 2:
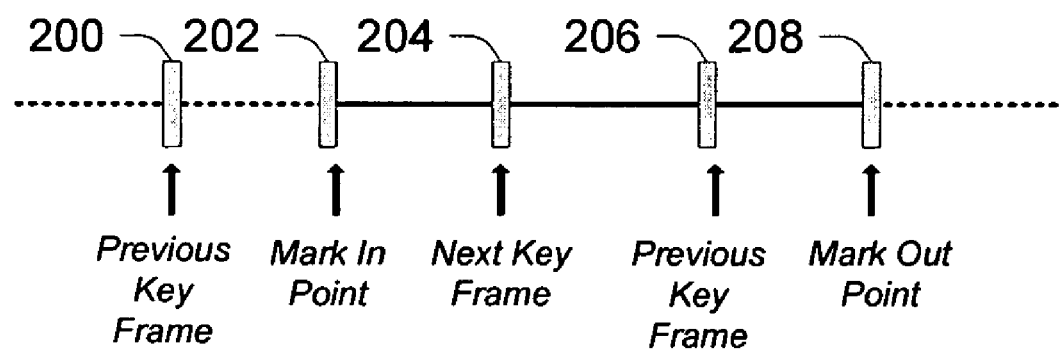
FIG. 2 is a diagrammatic illustration of a file that is used to describe file trimming operations in accordance one embodiment.

In the FIG. 2 illustration, several parts of the file are designated and include previous key frames 200, 206, a so-called mark in point 202, a next key frame 204 and a so-called mark out point 208.

Consider first a situation in which a user wishes to trim the beginning portion of the file. In this case, a user indicates, via the software application, a mark in point. The mark in point defines the position in the file before which the content is to be discarded. Content that is to be discarded is indicated in the illustration as a dashed line.

When the user defines a mark in point, the inventive process determines if the mark in point is a key frame. If so, then all of the samples before that key frame can be discarded. If, however, the mark in point is not a key frame, then the previous key frame—in this case key frame 200—is located so that the frame associated with the mark in point can be decoded. Once the previous key frame is located, decoding can take place from that key frame up to and through the mark in point. From the mark in point forward, all of the samples will be decoded and re-encoded up until the next key frame—here, key frame 204, after which the re-encoded frames can be written to an output file.

In accordance with the described embodiment, when the frame associated with the mark in point is re-encoded, it is re-encoded as a key frame. In addition, the intermediate or delta frames that built upon the re-encoded previous delta frame (now the new key frame) are re-encoded so that their dependency on the new key frame can be established. Now, when the next key frame 204 is reached, all of the compressed samples can be directly copied to the output file.

Now consider this example in the context of the buffer fullness information mentioned above. In accordance with one embodiment, each frame of the file has buffer fullness information associated with it. During an analysis process in which the previous and next key frames are identified, buffer fullness information is calculated for all the samples. For the segments that need to be re-encoded, the starting and ending buffer fullness information is ascertained and used to configure an encoder for re-encoding the segment. The buffer fullness information is used by the encoder or compressor to ensure that the samples are compressed in a manner that does not violate any constant bit rate conditions that might be imposed, as will be appreciated by the skilled artisan. Thus, when the encoder compresses the samples beginning with the frame associated with the mark in point, it processes the buffer fullness information associated with the compressed sample to ensure that when the samples are recompressed, the samples do not violate the constant bit rate conditions. During the analysis process, if the location of the new key frame associated with the mark in point is too close to the next key frame, which would not allow enough bitrate to encode the mark in point to a key frame, an intelligent decision can be as to where to locate the next key frame 204. In the embodiment described below, this processing and decision making is performed by an analyzer component.

As an example, consider the following. In an extreme example, assume that the mark in point is right next to key frame 204. This means that the new key frame will be located right next to key frame 204. Since key frames consume a large number of bits, as will be appreciated by the skilled artisan, the constant bit rate conditions may likely be violated. Thus, in order to preserve the quality of the output file in streaming scenarios, it is not desirable to have the key frames right next to each other. To deal with this situation, in accordance with the embodiment described below, the analyzer component can use the second next key frame as the "next" key frame to ensure that a proper amount of bandwidth is available to re-encode between mark in point and "next" key frame. The next key frame 204 and subsequent intermediate frames can be decoded and re-encoded to adjust the position of the key frame that follows the key frame associated with the mark in point. For example, in this scenario, the next key frame 204 might be re-encoded as an intermediate frame that depends on the new key frame, and one of the subsequent intermediate frames might be re-encoded as a key frame, thus complying with the constant bit rate conditions.

Figure 3:
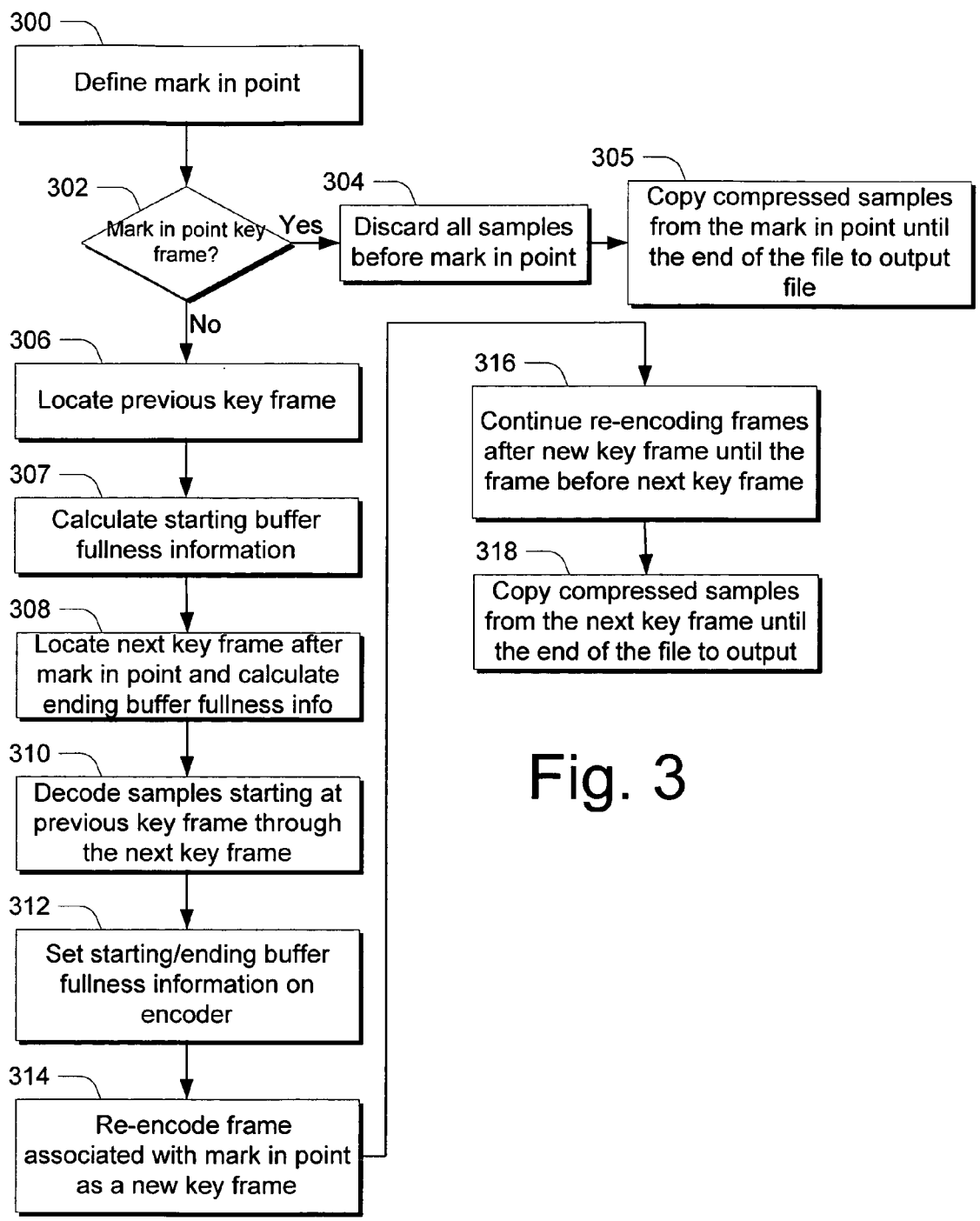
FIG. 3 is a flow diagram that describes steps in a file trimming method in accordance with one embodiment.

FIG. 3 is a flow diagram that describes steps in a trimming method in accordance with one embodiment in which content is trimmed from the front of a file. The method can be implemented in connection with any suitable hardware, software, firmware or combination thereof. In some embodiments, the method can be embodied as computer-readable instructions that reside on a computer-readable medium. In but one example, the method can be implemented using a system such as the one described below.

Step 300 defines a mark in point. This step can be accomplished by a user interacting with multimedia editing application, such as Windows® Movie Maker. Step 302 determines whether the mark in point is a key frame. If so, then step 304 discards all of the samples before the mark in point and step 305 copies compressed samples from the mark in point until the end of the file to an output file. If the mark in point is not a key frame, then step 306 locates the previous key frame and step 307 calculates the starting buffer fullness information associated with the mark in point. Step 308 locates the next key frame after the mark in point and calculates the ending buffer fullness information for the next key frame. Step 310 then decodes or decompresses samples or frames starting at the previous key frame and through the next key frame. Step 312 sets starting and ending buffer fullness information on the encoder and step 314 re-encodes the frame associated with the mark in point as a new key frame. Step 316 continues re-encoding frames after the new key frame until the frame before the next key frame, and copies re-encoded frames to the output file. Step 318 then copies compressed samples from the next key frame until the end of the file to the output file.

Now consider the situation where a user wishes to trim the end portion of the file. In this case, the user indicates a mark out point 208 (FIG. 2) which designates the location after which content is to be discarded. The inventive methodology takes two different approaches, depending on whether the file has been encoded using bi-directional or B-frames. If the file has been encoded without bi-directional frames, and there is no content that is to be appended after the mark out point, then the samples after the mark out point can simply be discarded. If bi-directional frames were used for encoding, then the method locates the previous key frame 206 and starts decompressing from there up to the mark out point. The samples from the previous key frame 206 up to the sample associated with the mark out point are then recompressed. This ensures that information that might be associated with bi-directional frames that occur before the mark out point in the file's encoded format, but after the markout point in the file's rendered format are not given out.

Figure 4:
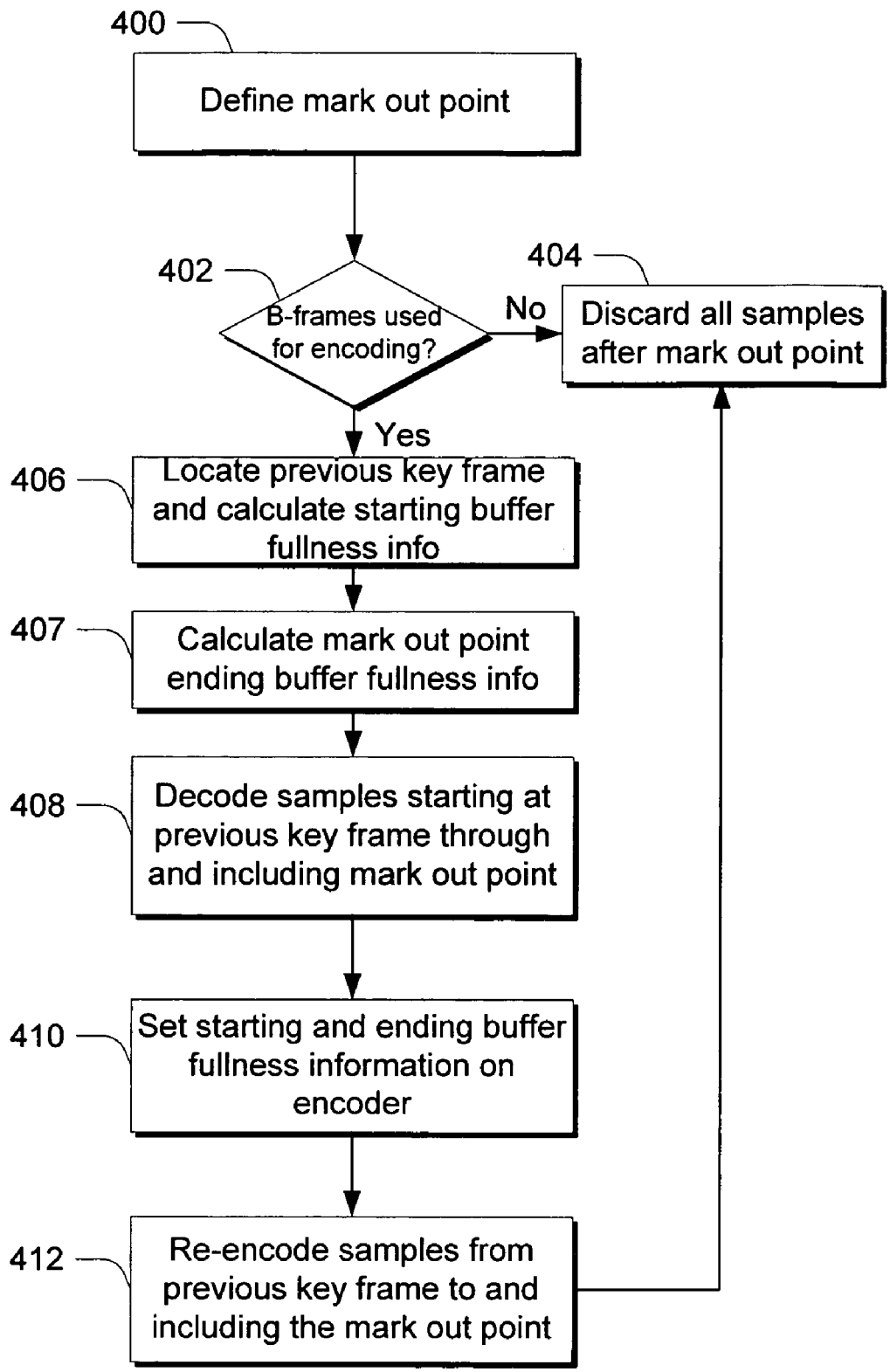
FIG. 4 is a flow diagram that describes steps in a file trimming method in accordance with one embodiment.

FIG. 4 is a flow diagram that describes steps in a trimming method in accordance with one embodiment in which content is trimmed from the end of a file. The method can be implemented in connection with any suitable hardware, software, firmware or combination thereof. In some embodiments, the method can be embodied as computer-readable instructions that reside on a computer-readable medium. In but one example, the method can be implemented using a system such as the one described below.

Step 400 defines a mark out point. This step can be accomplished by a user interacting with multimedia editing application, such as Windows® Movie Maker. Step 402 ascertains whether B-frames have been used in the encoding process. If no B-frames were used in the encoding process, then step 404 discards all of the samples or frames after the mark out point. If, on the other hand, B-frames were used in the encoding process, step 406 locates the previous key frame relative to the mark out point and calculates starting buffer fullness information related to the previous key frame and step 407 calculates buffer fullness information related to the mark out point. Step 408 decodes samples or frames starting at the previous key frame up through and including a frame associated with the mark out point. Step 410 then sets starting and ending buffer fullness information on the encoder, and step 412 re-encodes the samples from the previous key frame up through and including the mark out point, discarding all samples after the mark out point.

Stitching Files Together

Stitching refers to an operation that appends two pieces of content together. Typically, a user will have two or more different files and will desire to append portions of the two different files together. In the example that follows, assume that the portions of the files that are desired to be appended together have been trimmed as mentioned above.

Figure 5:
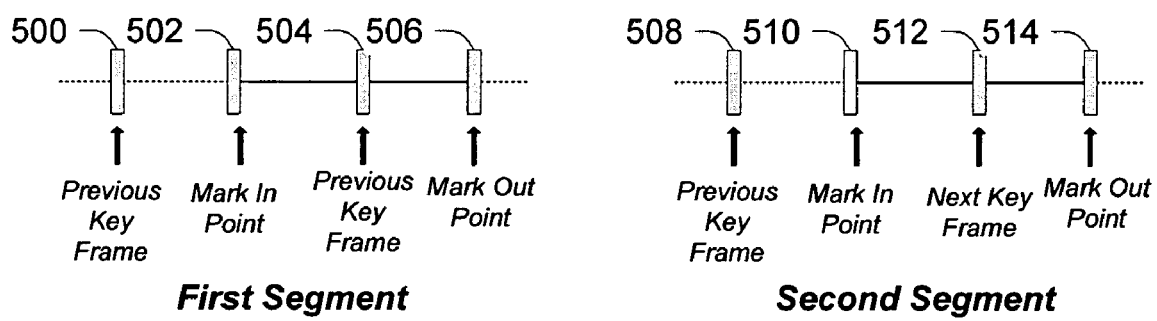
FIG. 5 is a diagrammatic illustration of a file that is used to describe file stitching operations in accordance one embodiment.

Specifically, consider FIG. 5 which shows exemplary first and second segments that are desired to be stitched together. In this example, the front of the file has been trimmed relative to mark in point 502 which, in this example, does not comprise a key frame. In so doing, recall that the previous key frame is located—here key frame 500—and the file is decoded from key frame 500 up through the frame associated with the mark in point 502. In this example, also assume that the end of the second segment has been trimmed as described above relative to the mark out point 514.

In accordance with the described embodiment, processing of the two file segments is performed somewhat differently than described above in the area of the junction between the two file segments. More specifically, consider the following. For the first segment, the process locates the previous key frame relative to the mark out point—here key frame 504—and ascertains the buffer fullness information associated with the key frame 504. Similarly, for the second segment, the process locates the previous key frame relative to the mark in point 510—here key frame 508, and starts the decoding process from there. In addition, the process locates the key frame after the mark in point on the second segment and ascertains the buffer fullness information associated with that key frame—here key frame 512.

In accordance with the described embodiment, the samples are decoded starting from key frame 504 through key frame 512. In addition, to ensure that bit rate conditions associated with the desired constant bit rate are not violated, the buffer fullness information associated with frames including key frame 504 and key frame 512 is provided to the compressor so that the constant bit rate conditions can be preserved. Recall that the compressor is configured, if necessary, to adjust the locations of the key frames to preserve the constant bit rate conditions.

Figure 6:
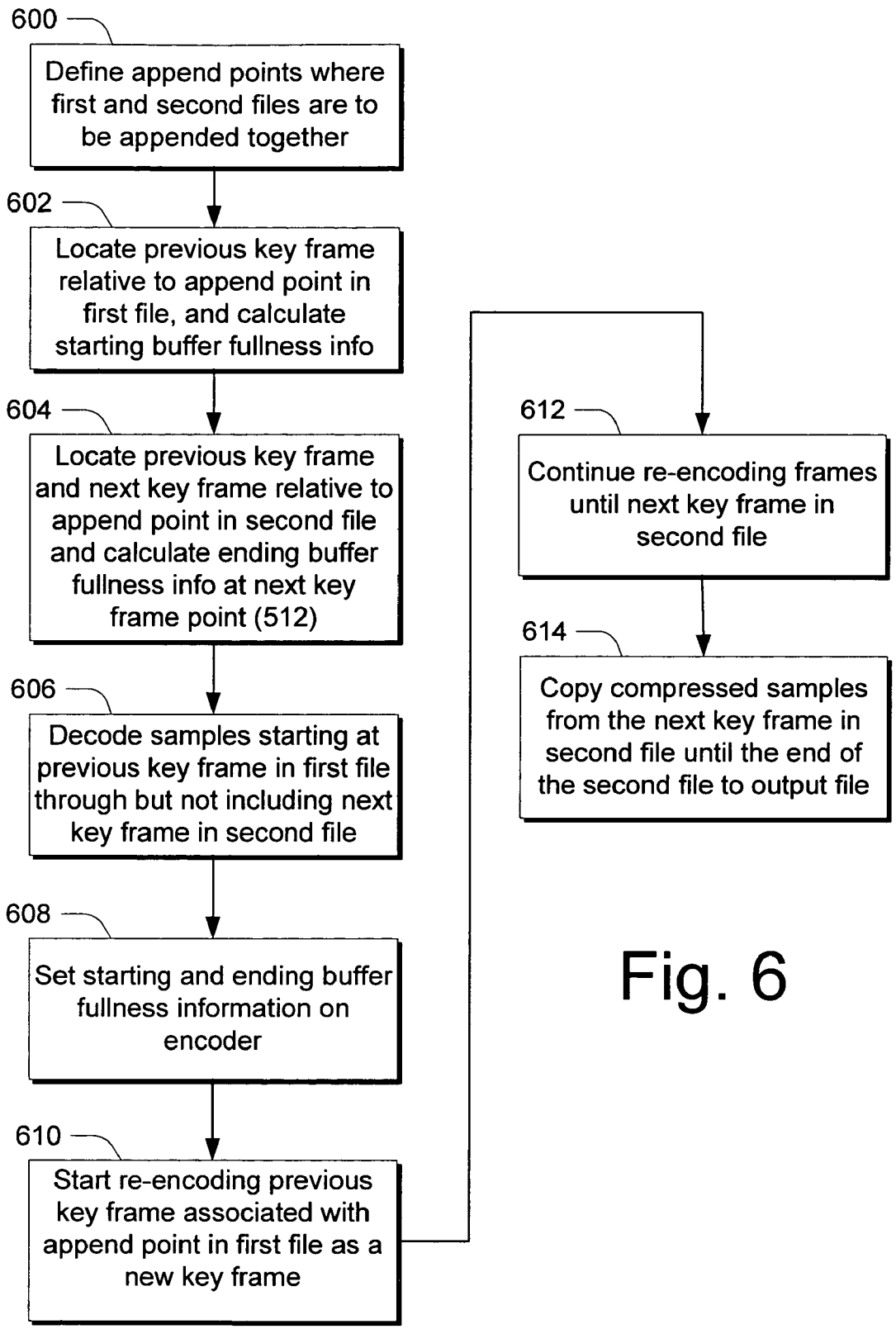
FIG. 6 is a flow diagram that describes steps in a file stitching method in accordance with one embodiment.

FIG. 6 is a flow diagram that describes steps in a stitching method in accordance with one embodiment in which content is stitched together from two different files. The method can be implemented in connection with any suitable hardware, software, firmware or combination thereof. In some embodiments, the method can be embodied as computer-readable instructions that reside on a computer-readable medium. In but one example, the method can be implemented using a system such as the one described below.

Step 600 defines append points where first and second files or file segments are to be appended together. In the example of FIG. 5, an append point for the first file segment corresponds to mark out point 506, and an append point for the second file corresponds to mark in point 510. Step 602 locates a previous key frame relative to the append point in the first file and calculates the starting buffer fullness for this key frame. In the FIG. 5 example, the previous key frame corresponds to key frame 504. Step 604 locates the previous key frame and the next key frame relative to the append point in the second file and calculates ending buffer fullness for the next key frame. In the FIG. 5 example, the previous and next key frames correspond respectively to key frames 508, 512. Step 606 decodes samples or frames starting at the previous key frame in the first file (i.e. key frame 504) through but not including the next key frame in the second file (i.e. key frame 512).

Step 608 sets starting and ending buffer fullness information on the encoder and step 610 starts re-encoding the frame associated with the append point in the first file as a new key frame. Step 612 continues to re-encode frames after the new key frame until the next key frame in the second file and copies those re-encoded frames to the output file. Step 614 copies compressed samples from the next key frame in the second file until the end of the second file to the output file.

Stitching Files Together with Transitions

In this example, two different file portions or segments can be stitched together and include a transition that is applied between the file segments. For example, consider FIG. 7 which shows two different first and second file segments with a transition that is applied between the two segments. In this example, the process determines the best places for decompressing and recompressing. Accordingly, in this example, the process locates the previous key frame relative to the mark in transition start frame 702 in the first segment—here key frame 700 and also calculates the starting buffer fullness information associated with this frame. In addition, the process locates the nearest next key frame after the mark out transition stop frame 710 in the second segment—here key frame 712 and calculates ending buffer fullness information associated with that frame. The process then decodes or decompresses all of the samples between these points and provides the decompressed samples to the compressor, including key frame 700 but not including key frame 712. It should be appreciated that decoding of the second segment takes place starting at the key frame 706 prior to the mark in transition start frame 708.

Figure 8:
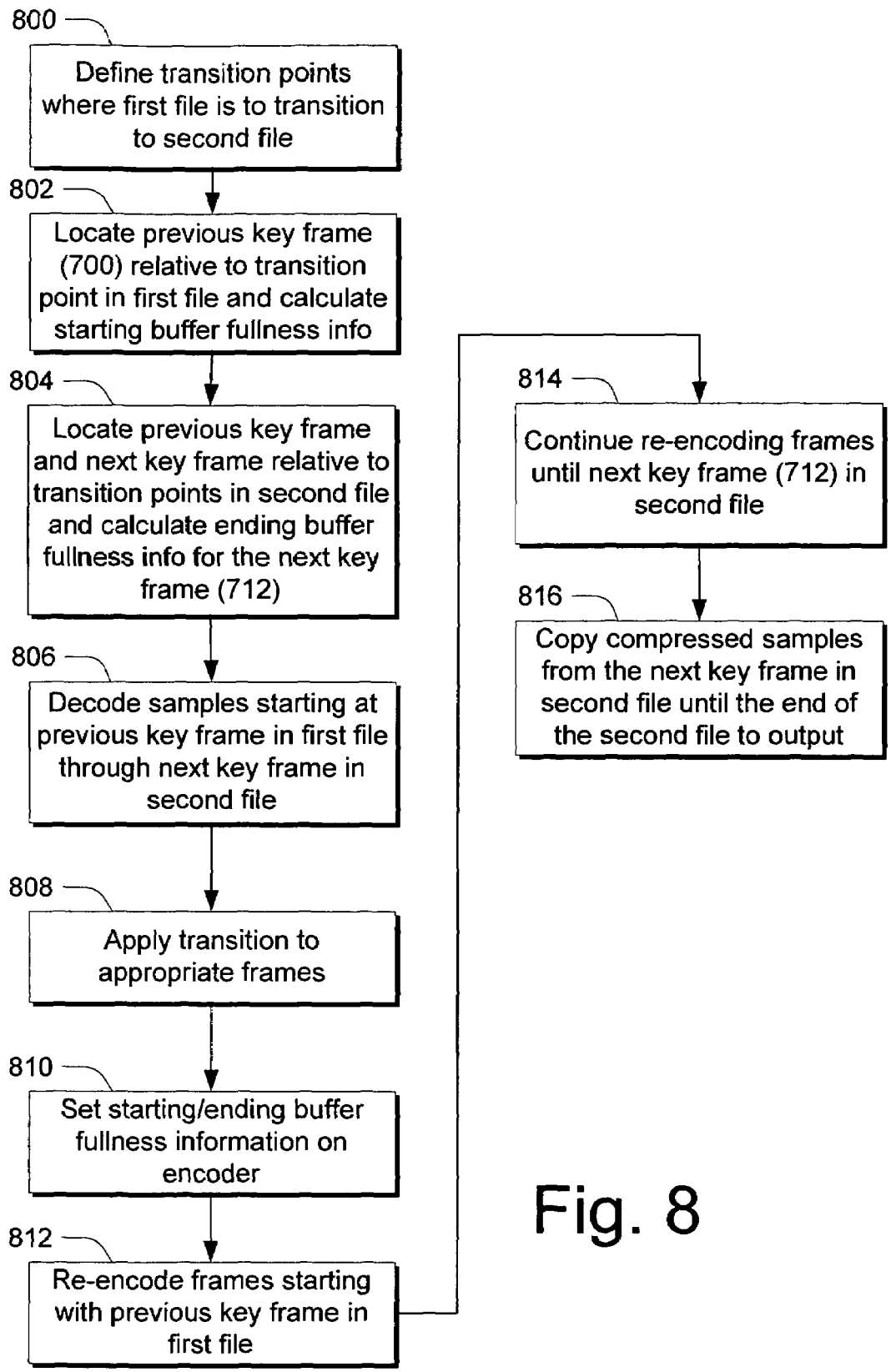
FIG. 8 is a flow diagram that describes steps in a file stitching/transition method in accordance with one embodiment.

FIG. 8 is a flow diagram that describes steps in a stitching with transition method in accordance with one embodiment in which content is stitched together from two different files and includes a transition between the file segments. The method can be implemented in connection with any suitable hardware, software, firmware or combination thereof. In some embodiments, the method can be embodied as computer-readable instructions that reside on a computer-readable medium. In but one example, the method can be implemented using a system such as the one described below.

Figure 7:
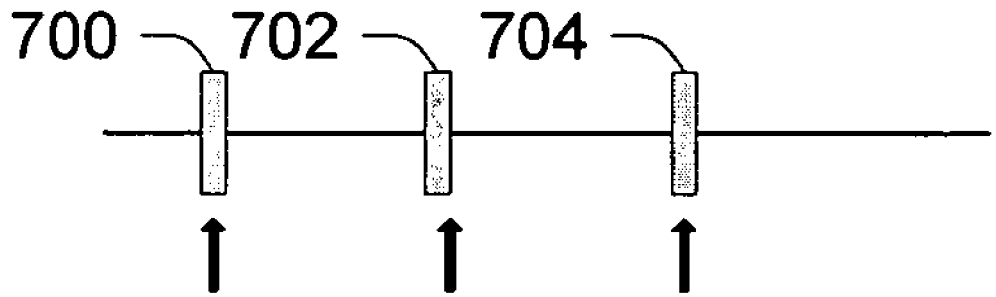
FIG. 7 is a diagrammatic illustration of a file that is used to describe file stitching/transition operations in accordance one embodiment.
Figure 7:
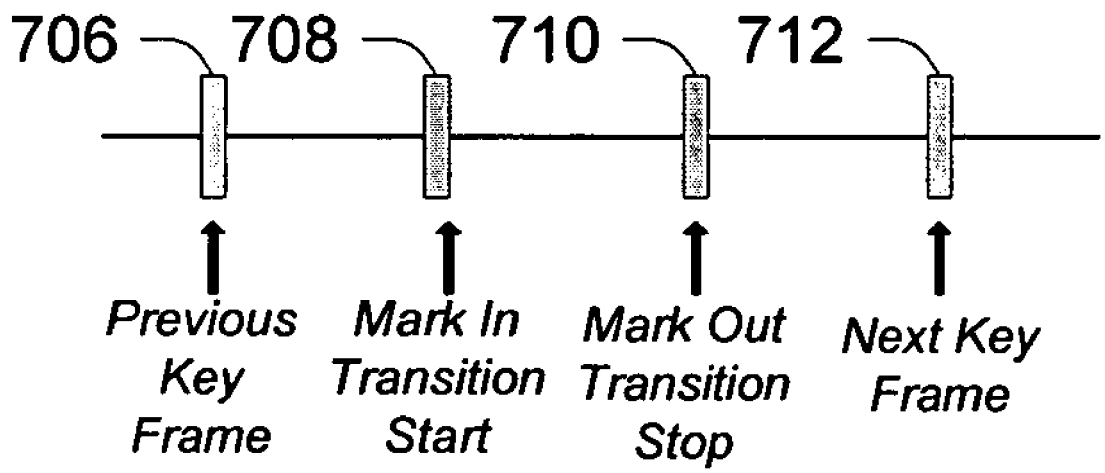

Step 800 defines transition points where the first file or file segment is to transition to the second file or file segment. In the example of FIG. 7, a transition point for the first file segment corresponds to mark in point 702, and a transition point for the second file corresponds to mark out point 710. Step 802 locates a previous key frame relative to the transition point in the first file and calculates starting buffer fullness information associated with the key frame. In the FIG. 7 example, the previous key frame corresponds to key frame 700. Step 804 locates the previous key frame and the next key frame relative to the transition point in the second file and calculates ending buffer fullness information for the next key frame. In the FIG. 7 example, the previous and next key frames correspond respectively to key frames 706, 712. Step 806 decodes samples starting at the previous key frame in the first file (i.e. key frame 700) through but not including the next key frame in the second file (i.e. key frame 712).

Step 808 applies the transition to appropriate decoded frames and step 810 sets buffer fullness information on the encoder. Step 812 re-encodes the frames starting with the previous key frame in the first file. Step 814 continues to re-encode frames after the previous key frame in the first file until the next key frame in the second file, and copies re-encoded frames to the output file. Step 816 copies compressed samples from the next key frame in the second file until the end of the second file to an output file.

Applying Effects to a File

In this example, an effect is applied to a single file portion. As an example, consider FIG. 9 which shows an exemplary file segment with an effect applied to it. In this example, the frame at which the effect begins is treated as a mark in point for the segment (i.e. frame 902) and the frame at which the effect ends is treated as the mark out point (i.e. frame 904). As such, the process locates the previous key frame relative to the mark in point—here frame 900—and calculates starting buffer fullness information associated with the previous key frame. The process also locates the next key frame after the mark out point—here frame 906—and calculates ending buffer fullness information associated with this frame. The process then decompresses the samples therebetween and provides the samples to the compressor so that the compressor can re-compress the samples. In addition, the buffer fullness information associated with the key frames is provided to the compressor so that the compressor can make an intelligent decision about where to locate key frames to preserve the bit rate conditions associated with a constant bit rate.

Figure 10:
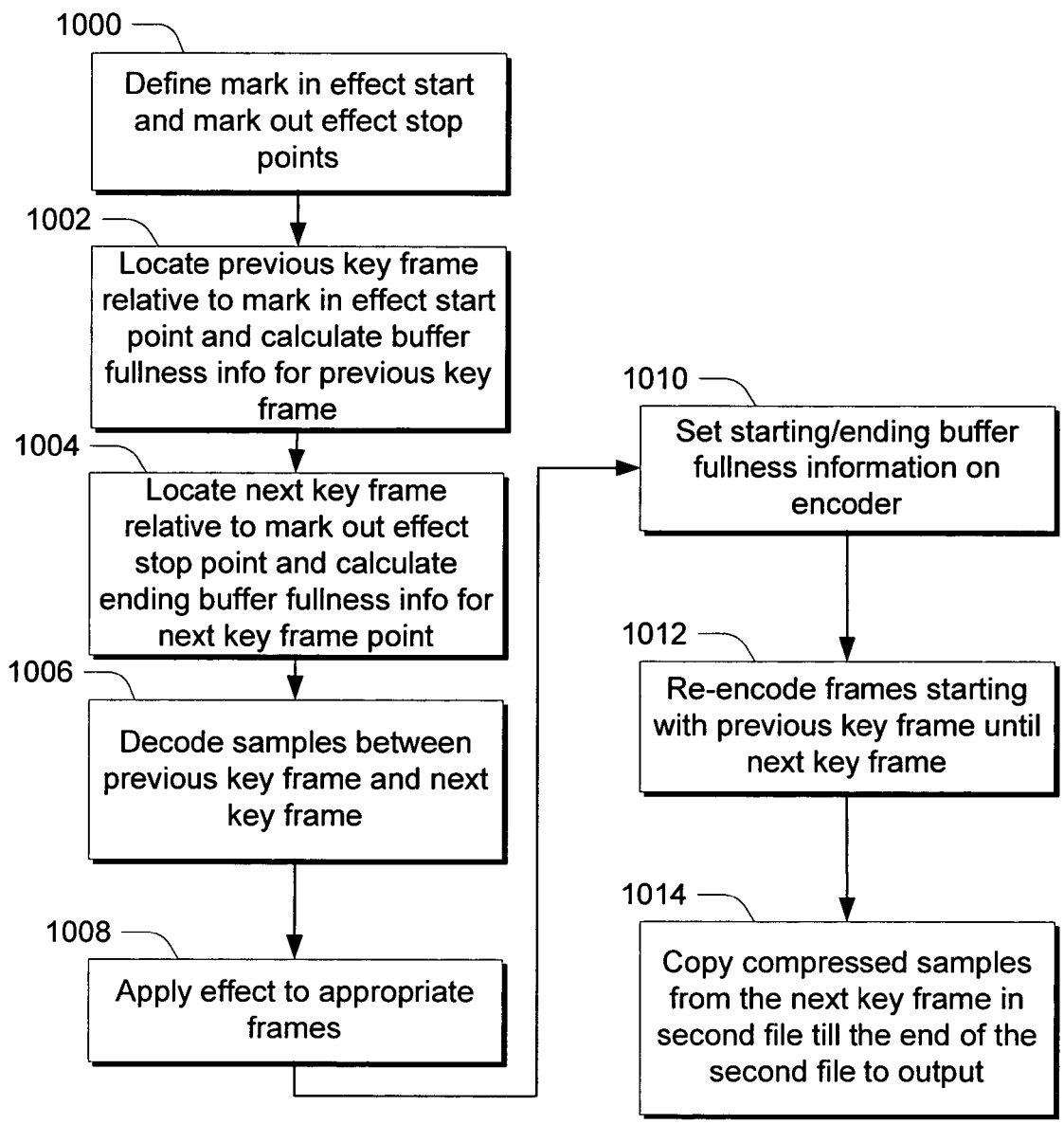
FIG. 10 is a flow diagram that describes steps in a method in which an effect is applied to a file portion in accordance with one embodiment.

FIG. 10 is a flow diagram that describes steps in a method in which an effect is applied to the content. The method can be implemented in connection with any suitable hardware, software, firmware or combination thereof. In some embodiments, the method can be embodied as computer-readable instructions that reside on a computer-readable medium. In but one example, the method can be implemented using a system such as the one described below.

Figure 9:
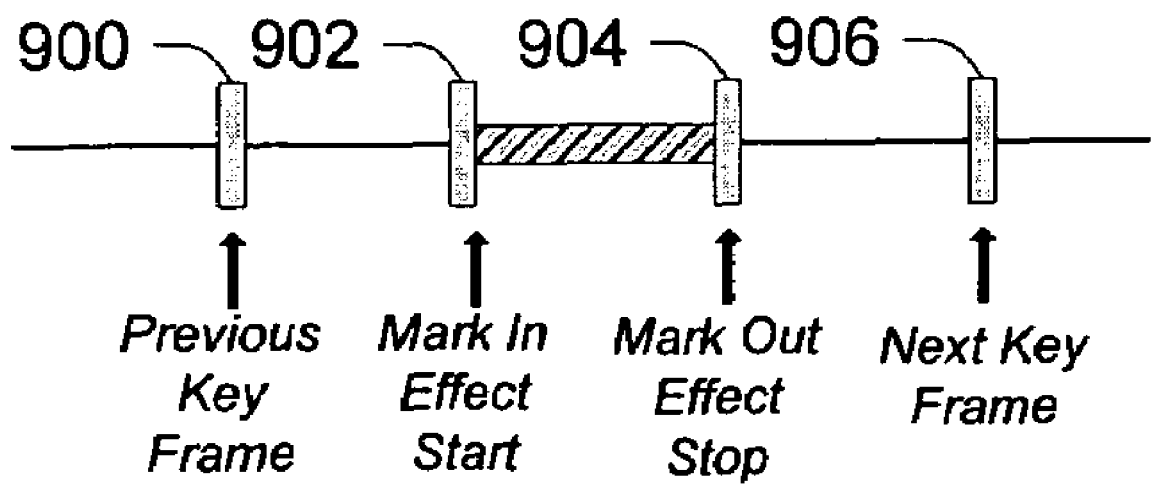
FIG. 9 is a diagrammatic illustration of a file that is used to describe operations that apply an effect to a file portion in accordance one embodiment.

Step 1000 defines mark in effect start and mark out effect stop points which, in the FIG. 9 example, correspond respectively to frames 902 and 904. Step 1002 locates the previous key frame relative to mark in effect start point and calculates the starting buffer fullness information associated with this key frame. In the FIG. 9 example, the previous key frame corresponds to key frame 900. Step 1004 locates the next key frame relative to mark out effect stop point and calculates the ending buffer fullness information associated with this frame. In the FIG. 9 example, the next key frame corresponds to key frame 906. Step 1006 decodes samples between previous key frame 900 and next key frame 906. Step 1008 applies the appropriate effect to the appropriate frames.

Step 1010 sets starting and ending buffer fullness information on the encoder and step 1012 re-encodes frames starting with the previous key frame until the next key frame and copies the re-encoded frames to the output file. Step 1014 copies compressed samples from the next key frame in the second file until the end of the second file to the output file.

Exemplary System for Practicing the Methodologies

Figure 11:
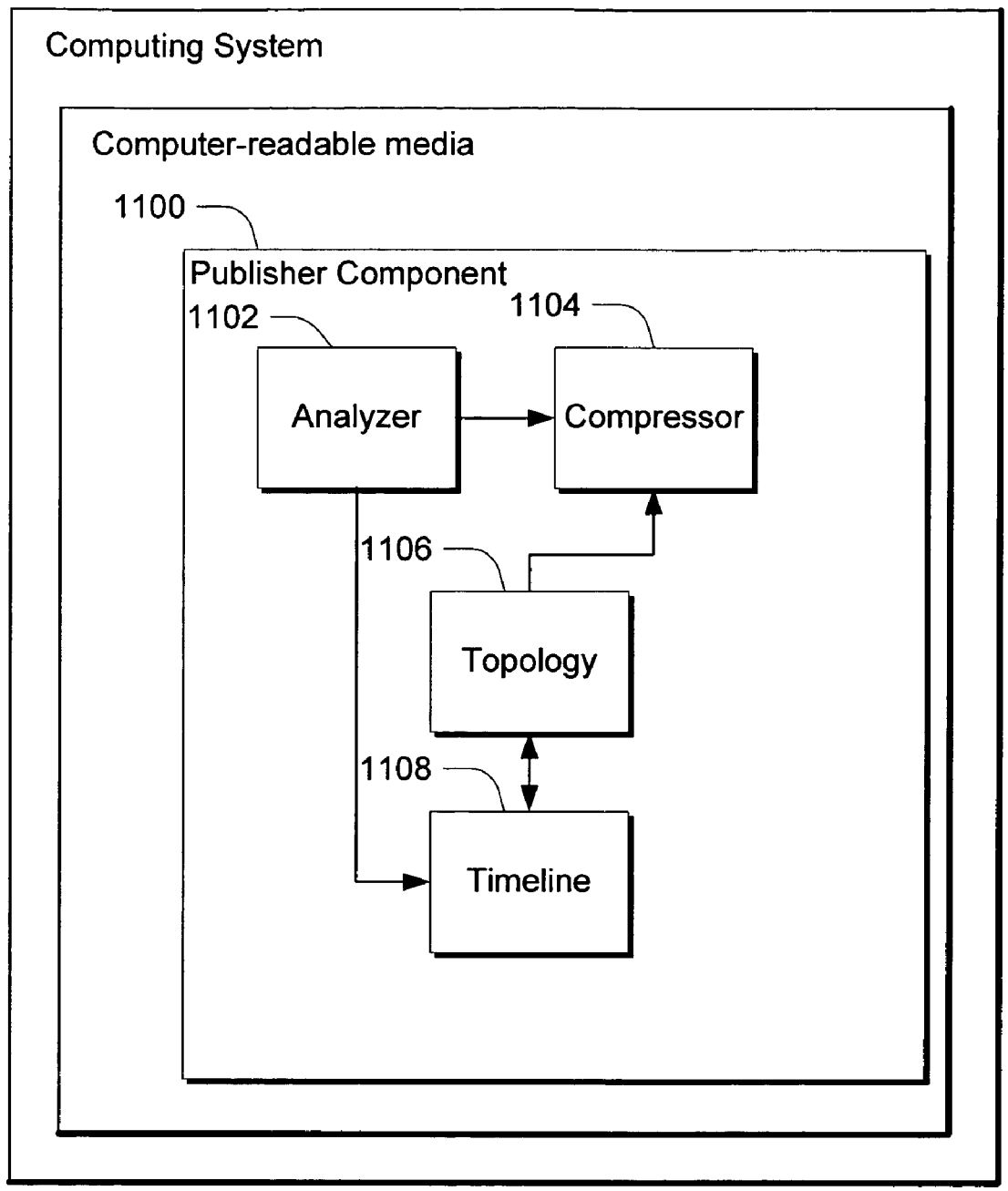
FIG. 11 is a block diagram of an exemplary component that can apply intelligent decompression and recompression in accordance with one embodiment.

FIG. 11 is a high level view of a software component that is configured to implement the methodology described above. The software component is in the form of a publisher component 1100 embodied on a computer-readable medium which, in turn, is embodied on a computing system. In the illustrated and described embodiment, publisher component 1100 contains an analyzer 1102 and builds a timeline object 1108 that is used to describe the media project. The publisher component 1100, through the analyzer 1102, develops information that is used to create an appropriate timeline object 1108 which, in turn, builds an appropriate topology 1106 after all of the processing described above takes place. In addition, the information that the analyzer 1102 develops is used by the publisher component 1100 to configure a compressor 1104 that compresses samples as described above.

Figure 12:
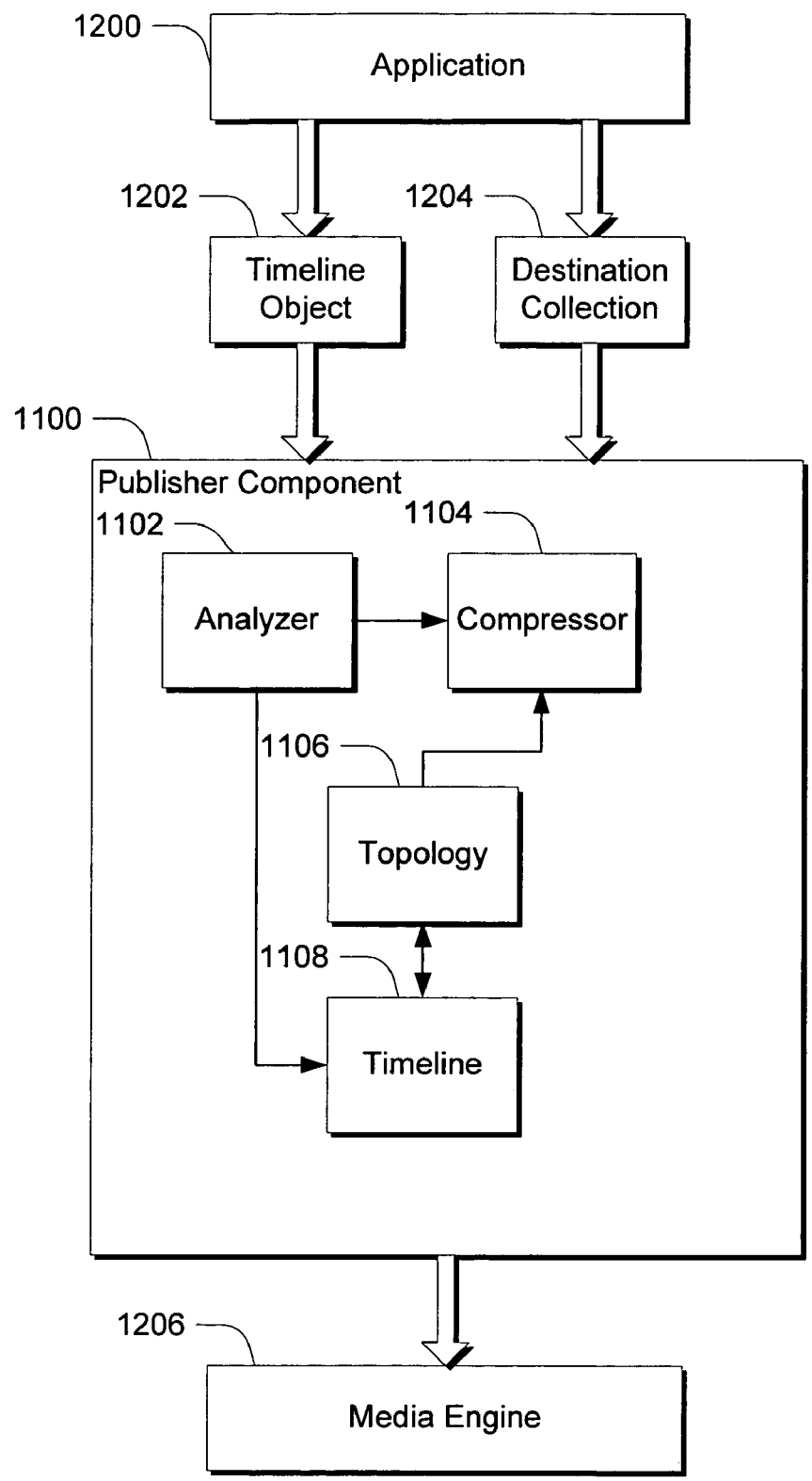
FIG. 12 is a block diagram of an exemplary system that can utilize the FIG. 11 component.

Consider now FIG. 12 and an exemplary system in which the publisher component 1100 can be employed. In this system, an editing application 1200, such as Windows® Movie Maker, allows a user to create, edit and share multimedia movies. In operation, application 1200 creates what is known as a timeline object 1202 that describes or represents the user's project. The timeline object 1202 effectively describes how the various media sources (i.e. files and file portions) are to be arranged. The application also defines a destination collection 1204. A destination collection effectively describes the resultant output and provides a profile of the output that describes configuration settings of the output, such as the compression settings that are to be used by compressor 1104.

Figure 13:
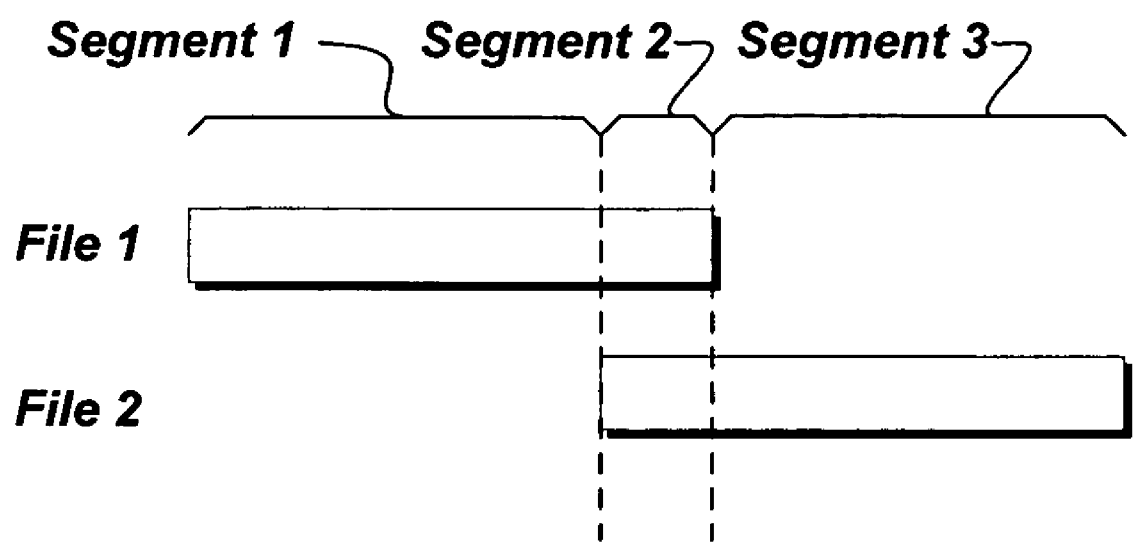
FIG. 13 is a diagram that illustrates a visual representation of a timeline object that represents a user-created project in accordance with one embodiment.

As an example, consider FIG. 13 which shows a visual representation of a timeline object that represents a user-created project. In this example, the timeline object includes two files—designated "File 1" and "File 2". The user's project is divided into three segments—segment 1, segment 2, and segment 3. Segment 1 comprises a portion of the File 1, segment 2 comprises a transition that the user has added, such as a SMPTE wipe between Files 1 and 2, and Segment 3 comprises a portion of File 3.

Once the application 1200 defines the timeline object 1202 and the destination collection 1204, this information is provided to the publisher component for processing as described below. In one embodiment, the publisher component can check the destination collection 1204 to ascertain whether the destination collection contains compression settings associated with encoding that supports that operations described just below. For example, Windows® Media Video 9 (WMV9) has an encoder the supports the operations that are described below. In the event that the destination collection does not support the operations described below, the timeline object 1202 and destination collection can simply be passed to the media engine 1206 for processing. The media engine 1206 is configured to process and render the user's project. An exemplary media engine is described in U.S. patent application Ser. No. 10/730,735, the disclosure of which is incorporated by reference.

Assume for ongoing purposes that the destination collection indicates that the compression settings indicate an encoder that supports the operations to be described. In this instance, the publisher component 1100 passes the timeline object 1202 and the destination collection 1204 to the analyzer 1102 for analysis.

In the illustrated and described embodiment, the processing that takes place is a two-step or two-phase process. The first step of the processing is an analysis step in which the user's defined timeline is processed and analyzed by the analyzer. The second step of the processing occurs when data is written out to an output file.

Analysis Step

In the example above, the user has inserted a transition between files 1 and 2. As noted above, the beginning of the transition is defined as a mark in point, and the end of the transition is defined as a mark out point. In its analysis, as described above in the section entitled "Stitching Files Together with Transitions", the analyzer locates the previous key frame relative to the beginning of the transition in file 1. In addition, the analyzer locates the next key frame after the end of the transition in file 2. This tells the analyzer that decompression and recompression is going to need to take place between these two points. In addition, as part of its analysis, the analyzer 1102 calculates starting and ending buffer fullness information for this range. In accordance with the described embodiment, buffer fullness parameters that the analyzer can calculate can comprise, without limitation: the number of bits with the range, the number of samples with the range, the start time (in terms of a global time line), the starting buffer fullness information associated with the previous key frame relative to the mark in point in file 1, the stop time (in terms of the global time line), and stopping buffer fullness information associated with the next key frame relative to the mark out point in file 2.

From its analysis, the analyzer is able to ascertain that the previous timeline object in FIG. 13, with its three segments, is not going to be adequate if the project portion is going to be intelligently processed. Rather, what emerges from the analyzer's analysis is a new timeline object that has five segments as shown in FIG. 14.

Thus, the analyzer 1102 is able to take a user-defined time line object 1202 (FIG. 12) and process it to derive a second new timeline object that more accurately represents the user's project so that intelligent decompression and recompression can be applied.

In the illustrated and described embodiment, once the new or second timeline object is derived, a partial topology of the new timeline object can be derived. The partial topology is used to describe or define how the data samples in the different files are to be processed and which components are going to process which segments. As an example, consider the partial topology diagrammatically illustrated in FIG. 14.

Figure 14:
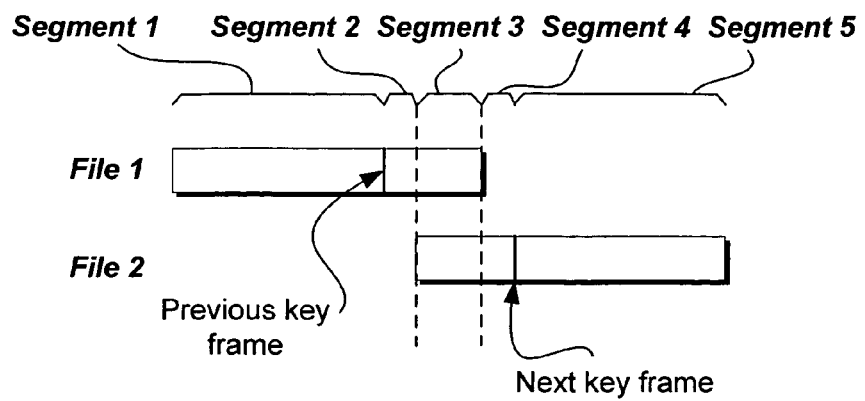
FIG. 14 is a diagram that illustrates a visual representation of a timeline object that is created from the timeline object of FIG. 13 in accordance with one embodiment.
Figure 14:
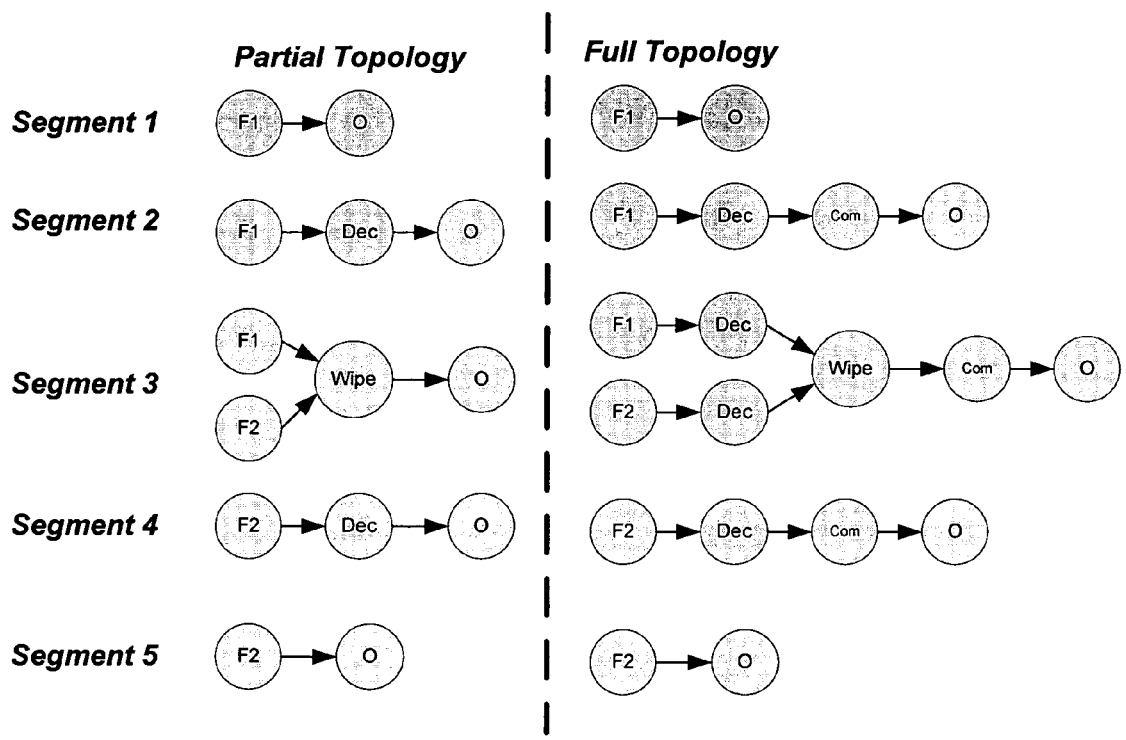

In this example, from the new timeline object of FIG. 14, the publisher component 1100 derives the partial topology and is able to ascertain that for segment 1, the source file 1 can be provided, in compressed form, directly to the output file. For segment 2, the publisher component 1100 defines file 1 as being provided to a decompressor and then to the output file.

For segment 3, which coincides to the transition between files 1 and 2, the publisher component defines files 1 and 2 as being provided to a composition component in the form of a wipe effect and then to the output file. For segment 4, the publisher component defines file 2 as being provided to a decompressor and then to the output file. Finally, for segment 5, the publisher defines file 2 as being copied, in compressed form, directly to the output file.

Now, given the partial topology described above, a component known as a topology loader takes the partial topology and produces from it, a full topology. An exemplary topology loader is described in U.S. patent application Ser. No. 10/796,505, the disclosure of which is incorporated by reference. In the illustrated and described embodiment, for those segments that need recompressed, the topology loader inserts a suitable compressor into the topology. Thus, in the present example, the topology loader inserts a compressor after the decoder for segments 2 and 4. For segment 3, the topology loader inserts a compressor after the wipe component.

At this point in the processing, a complete and full topology of the user's project has been defined and embodies intelligent decoding and encoding so that only those portions of the individual files that should be decompressed and processed are, in fact, decompressed and processed. Specifically, in the example, above, there is no need to decompress segments 1 and 5 because those segments are untouched by the user.

Data Writing Step

Having created the new timeline 1108 (FIG. 12) and partial and full topologies 1106 as described above, the publisher component 1100 uses the results of the analyzer's analysis and the new timeline to configure the compressor 1104 and actually begin writing compressed data to the output file.

User Selectable Compression Profile

One of the advantages of the above systems and methods is that a user can select compression profiles and have those compression profiles used to compress or encode files that are otherwise compressed in accordance with a different compression profile. This can be done via, for example, an application such as application 1200 (FIG. 12).

As an example, consider the following. Assume that a user has a number of files or file segments that they wish to stitch together and that each file or file segment may not have exactly the same compression applied. For example File 1 may be compressed at 320×240 with a bit rate of 100 Kbps, File 2 may be compressed at 640×480 with a bit rate of 1 Mbps, and File 3 may be compressed at 320×240 with 200 kbps. If the user wishes to stitch the files together and compress the project using a medium-type quality, the user may select the compression parameters associated with File 3—that is, at 320×240 with 200 kpbs. Since the compression applied to File 2 and File 1 does not exactly match these parameters, some extra processing can be applied to these files. More specifically, when stitching the files together, File 1 can be decompressed and recompressed to 200 kbps and written to an output file. In addition, File 2 can be decompressed, resized to the smaller size (320×240), recompressed at 200 Kpbs and written to the output file. File 3 might simply be copied to the output file. These changes in compression parameters as articulated by the user through the application can be handled, in at least some embodiments, by the publisher component 1100.

As will be appreciated in view of the discussion above, the buffer fullness information is used by the encoder during the re-encoding process to ensure that constant bit rate conditions are preserved so that playback of the project in streaming environments is smooth.

Application-Selectable Compression Profile and Intelligent Operation

In some embodiments, applications can be created that allow an application to automatically select a compression profile at which to encode content such that an intelligent decision is made as to the amount of content to decompress and re-compress. That is, given a number of file segments each with a different compression profile, a suitably configured application can analyze the collection of file segments and operations that are to be performed on the file segments, and can automatically select a compression profile that is directed to minimizing or at least reducing the amount of content that is decompressed and recompressed.

In addition, independent of or in addition to differences in compression profiles, applications can be configured to flexibly process and accommodate media in situations where the source format may not necessarily match the output format. That is, there are situations that can exist in which differences in format should not preclude processing.

As an example, consider the following. As part of the analysis that is described above, an analysis can be performed to ascertain whether identified sources have formats that match a desired output file format. In certain instances, where format differences appear, the inventive systems and method can still process the media. In this example, some scenarios in which this can occur pertain to private data, frame rates and bit rates.

With respect to private data, in some situations, private data does not need to match exactly between source format and output format. In the illustrated and described embodiment, at least some differences data format, e.g. private data format, do not inhibit the inventive processes described above from executing. These differences are handled during the processing that is described under the heading "Exemplary System for Practicing the Methodologies" above.

With respect to frame rate, consider the following. Some video formats utilize 30 frames/second (f/s), and some formats utilize 29.9997 f/s (or 0.03333 average time/frame). These formats are essentially equivalent and, as such, should be treated the same during the processing that is described above. In a situation where there are format differences that are essentially equivalent, the inventive processing described above can effectively treat the formats as equivalent.

With respect to bit rate, consider the following. If the destination bit rate is higher than the source bit rate, then the inventive processing described above should still take place because the higher bit rate in the destination will not change the quality of the source. The opposite, however, is not true, as will be appreciated by the skilled artisan. Thus, in this situation, when a difference in format will not affect the quality of the source media, then the inventive processing described above should still take place.

Summarizing, there are circumstances in which differences in file format between the source file(s) and the output file should not inhibit processing. Considerations that can be taken into account include the magnitude of the differences (as in the frame rate example) and the effect that processing the media would have on the output quality. In those instances where format differences are effectively equivalent or not meaningfully different, or are easily handled, then processing should take place. Likewise, in those situations in which format differences will not affect or meaningfully degrade the overall quality of the output file, then processing should take place.

CONCLUSION

Various methods and systems described above can enable content authors to achieve frame-accurate editing and can reduce the amount of content that undergoes decompression and recompression processing. In addition, various systems and methods can ensure that bit rate integrity is preserved so that bit rate conditions associated with streaming environments are preserved. In the approach that is described above, the various methods and systems are directed to intelligently determining which content portions should be decompressed, processed, and recompressed and which content portions should not be decompressed. The described approaches can enable content authors to produce even higher quality content in much less time than previously possible.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
    defining a mark in point relative to a file that designates frames of the file that are to be discarded, the file containing a plurality of frames;
    locating at least a previous and next independently-decodable key frame relative to the mark in point, the previous and next independently-decodable key frames defining a range of frames corresponding to a portion of the plurality of frames of the file;
    decoding entire frames for each frame of the range of frames starting at the previous key frame through the next key frame;
    re-encoding a frame associated with the mark in point as a new key frame; and
    re-encoding remaining frames up to the next key frame.

2. The method of claim 1, wherein the act of locating a previous independently-decodable key frame is performed only if a frame associated with the mark in point is not an independently-decodable key frame.

3. The method of claim 1 further comprising calculating buffer fullness information associated with frames that have been decoded and ascertaining whether a constant bit rate condition will be violated during the re-encoding process.

4. The method of claim 1 further comprising calculating buffer fullness information associated with frames that have been decoded and ascertaining whether a constant bit rate condition will be violated during the re-encoding process and, if so, adjusting the re-encoding process, and wherein said act of adjusting the re-encoding process comprises adjusting at least one independently-decodable key frame location.

5. The method of claim 1 further comprising receiving user-selected compression parameters and applying said compression parameters during said acts of re-encoding.

6. A computer-implemented method comprising:
    defining a mark out point relative to a file that designates frames of the file that are to be discarded, the file containing a plurality of frames;
    ascertaining whether the file includes bi-directional frames;
    in response to ascertaining that the file includes bi-directional frames:
        locating a previous independently-decodable key frame relative to the mark out point, the previous independently-decodable key frame and a frame associated with the mark out point defining a range of frames corresponding to a portion of the plurality of frames of the file;
        decoding entire frames for each frame of the range of frames starting at the previous independently-decodable key frame up through and including the frame associated with the mark out point;
        re-encoding frames starting with the previous independently-decodable key frame up through and including the frame associated with the mark out point.

7. The method of claim 6 further comprising after said re-encoding, discarding frames after the frame associated with the mark out point.

8. The method of claim 6 further comprising receiving user-selected compression parameters and applying said compression parameters during said act of re-encoding.

9. A computer-implemented method comprising:
    defining append points where first and second file segments are to be appended together, the file segments including a plurality of frames;
    locating a previous independently-decodable key frame relative to the append point in the first file segment;
    locating at least a previous and next independently-decodable key frame relative to the append point in the second file segment, the previous and next independently-decodable key frames defining a range of frames corresponding to a portion of the plurality of frames of the file segments;
    decoding entire frames for each frame of the range of frames starting at the previous independently-decodable key frame in the first file segment through and not including the next independently-decodable key frame in the second file segment;
    re-encoding a frame associated with the append point in the first file segment as a new key frame; and
    re-encoding remaining frames after the new key frame up through and including at least a frame associated with the append point in the second file segment.

10. The method of claim 9 further comprising calculating buffer fullness information associated with frames that have been decoded and ascertaining whether a constant bit rate condition will be violated during the re-encoding process.

11. The method of claim 9 further comprising calculating buffer fullness information associated with frames that have been decoded and ascertaining whether a constant bit rate condition will be violated during the re-encoding process and, if so, adjusting the re-encoding process, wherein said act of adjusting the re-encoding process comprises adjusting at least one independently-decodable key frame location.

12. The method of claim 9 further comprising receiving user-selected compression parameters and applying said compression parameters during said acts of re-encoding.

13. A computer-implemented method comprising:
    defining transition points that define where a transition from a first file segment to a second file segment is to occur, the file segments including a plurality of frames;
    locating a previous independently-decodable key frame relative to a transition point in the first file segment;
    locating at least a previous and next independently-decodable key frame relative to a transition point in the second file segment, the previous and next independently-decodable key frames defining a range of frames corresponding to a portion of the plurality of frames of the file segments;

decoding entire frames for each frame of the range of frames starting with the previous independently-decodable key frame in the first file segment through but not including the next independently-decodable key frame in the second file segment;

applying the transition to at least some of the decoded frames; and re-encoding frames starting with the previous independently-decodable key frame in the first file segment up through and not including the next independently-decodable key frame in the second file segment.

14. The method of claim 13 further comprising calculating buffer fullness information associated with frames that have been decoded and ascertaining whether a constant bit rate condition will be violated during the re-encoding process.

15. The method of claim 13 further comprising calculating buffer fullness information associated with frames that have been decoded and ascertaining whether a constant bit rate condition will be violated during the re-encoding process and, if so, adjusting the re-encoding process, wherein the act of adjusting the re-encoding process comprises adjusting at least one independently-decodable key frame location.

16. The method of claim 13 further comprising receiving user-selected compression parameters and applying said compression parameters during said act of re-encoding.

17. A computer-implemented method comprising:

defining a mark in effect start point and a mark out effect stop point that defines a file segment of a file to which an effect is to be applied, the file including a plurality of frames;

locating a previous independently-decodable key frame relative to the mark in effect start point;

locating a next independently-decodable key frame relative to the mark out effect stop point, the previous and next independently-decodable key frames defining a range of frames corresponding to a portion of the plurality of frames of the file segments;

decoding entire frames for each frame of the range of frames starting with the previous independently-decodable key frame up through but not including the next independently-decodable key frame;

applying the effect to at least one decoded frame; and re-encoding frames starting with the previous independently-decodable key frame up through at least the next independently-decodable key frame.

18. The method of claim 17 further comprising calculating buffer fullness information associated with frames that have been decoded and ascertaining whether a constant bit rate condition will be violated during the re-encoding process.

19. The method of claim 17 further comprising calculating buffer fullness information associated with frames that have been decoded and ascertaining whether a constant bit rate condition will be violated during the re-encoding process and, if so, adjusting the re-encoding process, wherein said act of adjusting the re-encoding process comprises adjusting at least one independently-decodable key frame location.

20. The method of claim 17 further comprising receiving user-selected compression parameters and applying said compression parameters during said act of re-encoding.

21. A computer-implemented method comprising:

receiving one or more compressed multi-media files that are subject to one or more operations that require at least a portion of one or more file segments to be decoded, the one or more compressed files including a plurality of frames;

decoding entire frames for each frame of a range of frames defined by a previous and a next independently-decodable key frame relative to a mark in point, the range of frames corresponding to a portion of the plurality of frames, said act of decoding being performed on less than an entirety of at least one of the multi-media files;

performing said one or more operations on decoded portions of the one or more file segments to provide one or more resultant file segments; and re-encoding the resultant file segments, wherein said one or more operations comprises one or more of the following operations: a trimming operation, a transition operation, or an effect operation or combinations thereof, wherein the act of re-encoding is performed by an application that is configured to automatically select a compression profile to use for said act of re-encoding, and wherein said acts can be performed if one or more of said multi-media files have formats that do not match an output file format.

22. The method of claim 21 further comprising presenting to a user, a representation of said one or more segments, said representation enabling a user to select and operate upon selected segments.

23. The method of claim 21 further comprising, in an event that said formats do not match, ascertaining whether the formats are effectively equivalent and if so, at least performing said one or more operations.

24. The method of claim 21 further comprising, in an event that said formats do not match, ascertaining whether quality of said multi-media files will be degraded if said one or more operations are performed and if not, performing said one or more operations.

* * * * *